3,794,615
Patented Feb. 26, 1974

3,794,615
MELT STABILIZED AROMATIC POLYSULPHONES
WITH PHOSPHORUS COMPOUNDS
Gordon Maxwell Beverly, Welwyn Garden City, England, assignor to Imperial Chemical Industries Limited, London, England
No Drawing. Filed Feb. 22, 1972, Ser. No. 228,260
Claims priority, application Great Britain, Mar. 10, 1971, 6,450/71, 6,452/71, 6,453/71, 6,455/71, 6,456/71, 6,457/71
Int. Cl. C08g 23/00
U.S. Cl. 260—45.7 P                    6 Claims

ABSTRACT OF THE DISCLOSURE

A thermoplastic composition comprising (a) 96 to 99.9% by weight of at least one aromatic polysulphone and (b) 4 to 0.01% by weight of at least one salt of at least one oxy-acid of phosphorus containing an alkali metal and/or alkaline earth.

---

The invention relates to thermoplastic polymer compositions and in particular to aromatic polysulphones having improved thermal stability.

Aromatic polysulphones and methods for making them are described in British patent specifications 1,016,245; 1,060,546; 1,078,234; 1,109,842; 1,122,192; 1,133,561; 1,153,035; 1,153,528; 1,177,183 and 1,234,301, Belgian patent specification 741,965, Canadian patent specification 847,963, Dutch patent specification 7011346, and Swiss patent specification 491,981. They are generally thermoplastic materials of high softening point. Owing to their high softening point, and generally rather high melt viscosities at even higher temperatures, the aromatic polysulphones may tend to decompose as evidenced by an increase in melt viscosity or a darkening in color unless precautions are taken to stabilize the polymer.

It has now been found that aromatic polysulphones and their blends can be mixed with metal phosphates or phosphites to form compositions having improved thermal stability.

According to the present invention a thermoplastic composition is provided comprising (a) 96 to 99.99% by weight of at least one aromatic polysulphone and (b) 4 to 0.01% by weight of at least one salt of at least one oxy-acid of phosphorus containing an alkali metal and/or alkaline earth.

The aromatic polysulphones described in the above-mentioned British specifications comprise repeating units of the formula —Ar—SO$_2$— in which Ar is a bivalent aromatic radical and may vary from unit to unit in the polymer chain (so as to form copolymers of various kinds). Thermoplastic polysulphones generally have at least some units of the sstructure

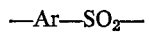

in which Z is oxygen or the residue of an aromatic diol such as a 4,4′-bisphenol. One example of such a polysulphone has repeating units of the formula

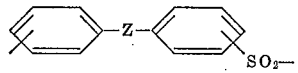

and others (which are commercially available in the United States of America) are said to have repeating units of the formula

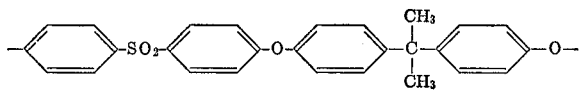

(Union Carbide Corporation) or copolymerized units in various proportions of the formulae

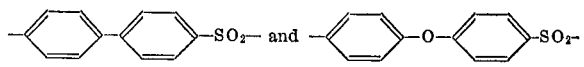

(Minnesota Mining and Manufacturing Company). Another group of thermoplastic aromatic polysulphones has repeating units of the structure

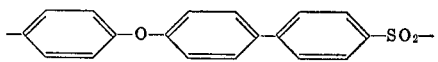

either alone or copolymerized with any of the above units.

The salt of an oxy-acid of phosphorus is present as the alkali metal or alkaline earth salt. Some or all of the alkali metal cation may be replaced by ammonium or organic onium cation having a positively charged heteroatom (for example a quaternary ammonium cation such as tetramethylammonium) stable under conditions used for making the compositions of the present invention. The term "alkali metal salt" herein is deemed to refer also to salts containing such onium cations. Preferred alkali metals are sodium and potassium and preferred alkaline earths are calcium and magnesium.

The alkali metal salt or alkaline earth salt of an oxy-acid of phosphorus is a phosphate or phosphite. The salt may be a mixture of oxy-acid salts and/or metals and may contain the salts in the form of glasses or polymers. Examples of oxy-acids of phosphorus are:

| Name | Probable structure | Anion |
|---|---|---|
| Hypophosphorous acid | H$_2$P(O)OH | H$_2$PO$_2^-$ |
| Metaphosphorous acid | HOP(O) | PO$_2^-$ |
| Pyrophosphorous acid | HO—P(H)(=O)—O—P(H)(=O)—OH | H$_2$P$_2$O$_5^{2-}$ |
| Orthophosphorous acid | (HO)$_2$PH(O) | HPO$_3^{2-}$ |
| Hypophosphoric acid | HO—P(=O)(OH)—P(=O)(OH)—OH | H$_2$P$_2$O$_6^{2-}$, HP$_2$O$_6^{3-}$, P$_2$O$_6^{4-}$ |
| Metaphosphoric acid | HOP(O)$_2$ | PO$_3^-$ |
| Triphosphoric acid | HO—P(=O)(OH)—O—P(=O)(OH)—O—P(=O)(OH)—OH | Various including P$_3$O$_{10}^{5-}$ |
| Pyrophosphoric acid | HO—P(=O)(OH)—O—P(=O)(OH)—OH | H$_2$P$_2$O$_7^{2-}$, P$_2$O$_7^{4-}$ |
| Orthophosphoric acid | (HO)$_3$PO | H$_2$PO$_4^-$, HPO$_4^{2-}$, PO$_4^{3-}$ |

Preferred salts are those derived from pyrophosphoric and orthophosphoric acids (i.e. pyrophosphates and orthophosphates). Hydrates of the salts may be used in the compositions of the invention although anhydrous salts are preferred as hydrate water may be released during subsequent processing of the compositions with possible adverse effect on composition physical properties. Where an oxy-acid anion has valency two or more, one valency may be satisfied by an organic group R which is alkyl, aryl, alkaryl, aralkyl or alicyclic group containing up to 20 carbon atoms.

The compositions of the invention may be made by mixing the salt with the molten polymer by, for example, extrusion or in a sigma-bladed mixer or in a two-roll mill, or by mixing an aqueous solution of the salt with powdered polymer followed by drying.

The aromatic polysulphone may be blended with other thermoplastic polymeric substances such as, for example, polyesters, polyolefines, polyamides and polyvinyl chloride. The composition may be further mixed with particles of other polymeric materials having special properties, e.g. elastomeric materials and polytetrafluoroethylene. They may contain reinforcing fillers, for example glass, asbestos, and carbon fibres, and other materials conferring various desired characteristics, e.g. solid lubricants (e.g. graphite or molybdenum disulphide), abrasives (e.g. Carborundum), friction-conferring materials, magnetic materials (e.g. for recording tapes), photosensitizers, and any other materials for which the compositions of the invention make suitable vehicles. The compositions may contain dyes and pigments. The compositions may be fabricated in any desired form, such as fibre, film and mouldings or extruded products of any desired shape.

Incorporation of 0.01% to 4% by weight of a metal salt of an oxy-acid of phosphorus reduces the tendency of the melt viscosity and color to increase on prolonged heating of the aromatic polysulphone and its blends. Inclusion of greater quantities appears to have little further effect and may lead to unacceptable opacity in otherwise essentially transparent compositions. A preferred level of inclusion of salt is 0.01 to 2% by weight.

The invention is illustrated by the following examples in which the aromatic polysulphone consists essentially of repeating units of the formula

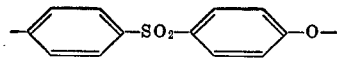

made in a manner similar to that described in Example 3 of British specification 1,153,035. Reduced viscosity of the polymer was measured at 25° C. on a solution in dimethyl formamide containing 1 g. of polymer in 100 cm.³ of solution. Thermal stability was measured as the increase in melt viscosity (expressed as a percentage) as measured on a ram extruder having a barrel temperature of 380° C. or 400° C.

EXAMPLE 1

A solution of disodium hydrogen phosphate ($Na_2HPO_4$) (0.2 g.) in distilled water (100 cm.³) was mixed with powder of aromatic polysulphone (100 g.; reduced viscosity 0.48). The mixture was dried in an air oven for 20 hours at 150° C. and then compression moulded at 320° C. For comparison, compression mouldings from aromatic polysulphone containing no phosphate and 1.0% phosphate were produced. The compression mouldings were granulated and fed into a ram extruder for evaluation of heat stability.

| | Percent increase in melt viscosity | | Color after 90 minutes at 380° C. |
|---|---|---|---|
| | After 45 minutes | After 90 minutes | |
| $Na_2HPO_4$, percent by weight: | | | |
| 0 | 20 | 50 | Brown. |
| 0.2 | 0 | | |
| 1.0 | 0 | 0 | Very light brown. |

EXAMPLE 2

The procedure of Example 1 was followed except that the reduced viscosity of the aromatic polysulphone was 0.51 and that the aromatic polysulphone was mixed with a solution in 100 cm.³ distilled water of 0.05 g. disodium hydrogen phosphate.

The polymer composition showed no increase in melt viscosity at 380° C. after 90 minutes. By comparison, a sample of polymer processed similarly but containing no phosphate showed an 8% increase after 90 minutes at 380° C. The color of the polymer composition after 90 minutes at 380° C. was less brown than that of aromatic polysulphone similarly heated but containing no phosphate.

EXAMPLE 3

Calcium hydrogen phosphate (0.1 g.) and aromatic polysulphone (100 g.; reduced viscosity 0.50) were blended as powders and compounded in a "Transfermix" at 320° C.

The polymer composition showed a 50% increase in melt viscosity at 400° C. after 80 minutes; by comparison, a sample of polymer processed similarly but containing no phosphate showed a melt viscosity increase of 100% after 80 minutes at 400° C. The color of the polymer composition was less brown than that of the polymer alone after heating for 80 minutes at 400° C.

EXAMPLE 4

A solution of disodium dihydrogen pyrophosphate ($Na_2H_2P_2O_7$) (0.5 g.) in distilled water (90 cm.³) and methanol (100 cm.³) was mixed with powder of aromatic polysulphone (100 g.; reduced viscosity 0.48). The mixture was dried in an air oven for 20 hours at 150° C. and then compression-moulded at 380° C. For comparison, a compression-moulding from aromatic polysulphone containing no phosphate was produced.

The compression-mouldings were granulated and fed into a ram extruder for evaluation of heat stability. The composition containing phosphate showed no increase in melt viscosity after 90 minutes at 380° C. but the aromatic polysulphone containing no phosphate showed a 50% increase over the same period and a poorer color.

EXAMPLE 5

A solution of sodium pyrophosphate ($Na_4P_2O_7$) (0.2 g.) in distilled water (100 cm.³) was mixed with powder of aromatic polysulphone (100 g.; reduced viscosity 0.48). The mixture was dried in an air oven for 20 hours at 150° C. and then compression-moulded at 320° C. For comparison, compression-moldings from aromatic polysulphone containing no phosphate were produced.

The compression-mouldings were granulated and fed into a ram extruder for evaluation of heat stability. The polymer composition containing phosphate showed no increase in melt viscosity after 90 minutes at 380° C. whereas polymer containing no phosphate showed a 50% increase over the same period and greater discoloration.

EXAMPLE 6

Calcium pyrophosphate ($Ca_2P_2O_7$; 01 g.) and aromatic polysulphone (100 g.; reduced viscosity 0.50) were blended as powders and compounded in a "Transfermix" at 320° C.

The polymer composition showed a 60% melt viscosity increase after 80 minutes at 400° C.; by comparison, a sample of polymer processed similarly but containing no phosphate showed a melt viscosity increase of 100% after 80 minutes at 400° C. and the extrudate was a darker brown than extrudate from the composition.

EXAMPLE 7

A solution of sodium dihydrogen phosphate ($NaH_2PO_4$) (0.5 g.) in distilled water (90 cm.³) and methanol (100 cm.³) was mixed with powder of aromatic polysulphone (100 g.; reduced viscosity 0.48). The mixture was dried in an air oven for 20 hours at 150° C. and then compression-moulded at 380° C. For comparison, a compression moulding from aromatic polysulphone containing no phosphate was produced.

The compression mouldings were granulated and fed into a ram extruder for evaluation of heat stability. The composition containing phosphate showed an 8% increase in melt viscosity after 90 minutes at 380° C., but the aromatic polysulphone containing no phosphate showed a 50% increase over the same period and a poorer color.

EXAMPLE 8

Aromatic polysulphone (100 g.; reduced viscosity 0.50) was wetted with methanol (about 20 cm.³) and stirred into a solution of sodium phosphate ($Na_3PO_4$; 1.5 g.) in distilled water (300 cm.$^3$) for 1 hour. The mixture was filtered and the resulting material filtered on a Büchner funnel for 5 minutes. The filter cake so formed had a moisture content of 30% (w./w.) and a sodium phosphate content of about 0.2% by weight based on the weight of polymer. The cake was dried for 18 hours at 150° C. and compression moulded at 320° C.

The compression moulding was granulated and fed into a ram extruder for evaluation of heat stability. It was found that the composition showed no increase in melt viscosity after 40 minutes at 400° C. although some bubbles appeared in the melt after 25 minutes. By comparison, polymer containing no phosphate showed a 30% increase in melt viscosity after 40 minutes at 400° C. and bubbles appeared in the melt after 15 minutes.

EXAMPLE 9

Aromatic polysulphone (100 g.; reduced viscosity 0.50) was wetted with methanol (about 20 cm.$^3$) and stirred into a solution of sodium triphosphate (1.5 g.; $Na_5P_3O_{10}$ obtained as commercial material containing 75% to 95% by weight of triphosphate) in distilled water (300 cm.$^3$) for 1 hour. The mixture was filtered and the resulting material filtered on a Büchner funnel for 5 minutes. The filter cake so formed had a moisture content of 30% w./w. and a sodium triphosphate content of about 0.2% by weight based on the weight of polymer. The cake was dried for 18 hours at 150° C. and compression moulded at 320° C.

The compression moulding was granulated and fed into a ram extruder for evaluation of heat stability. It was found that the composition showed a 15% rise in melt viscosity after 40 minutes at 400° C. and some bubbles appeared after 50 minutes. By comparison, polymer containing no phosphate showed a 30% increase in melt viscosity after 40 minutes at 400° C. and bubbles appeared after 15 minutes.

EXAMPLE 10

In three different experiments, aromatic polysulphone (100 g.; reduced viscosity 0.50) was added as powder to solutions in water/methanol (100 cm.$^3$; 9/10 v./v.) containing 0.1 g. of sodium hypophosphite ($NaH_2PO_2$), calcium hypophosphite [$Ca(HPO_2)_2$], sodium hexametaphosphate [$(NaPO_3)_6$] or phenyl disodium phosphate [$(PhO)(NaO)_2PO$]. The resulting mixtures were partially dried on a rotary evaporator for 30 minutes at 40° C. and finally dried for 20 hours at 150° C. The compositions were compression-moulded at 320° C.

The compression-mouldings were granulated and fed into a ram extruder for evaluation of heat stability. The polymer compositions containing phosphate or phosphite each showed a 40% increase in melt viscosity after 80 minutes at 400° C., except phenyl disodium phosphate which showed a 55% increase whereas polymer containing neither phosphate nor phosphite showed an 80% increase over the same period at the same temperature.

I claim:

1. A thermoplastic aromatic polysulphone composition of improved melt stability comprising (a) 96 to 99.99% by weight of at least one aromatic polysulphone having repeating units of the formula —$ArSO_2$— in which Ar is a bivalent aromatic radical which may vary from unit to unit in the polymer chain and (b) 4 to 0.01% by weight of an additive which improves the melt stability of said polysulphone, said additive being at least one salt of at least one oxy-acid of phosphorus containing at least one member of the group consisting of an alkali metal and alkaline earth metal.

2. A thermoplastic composition according to claim 1 in which the salt of an oxy-acid of phosphorus is a phosphate.

3. A thermoplastic composition according to claim 1 in which the alkali metal is sodium.

4. A thermoplastic composition according to claim 1 in which the aromatic polysulphone has repeating units of the formula

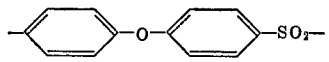

5. A thermoplastic composition according to claim 1 in which the form of a moulded article.

6. A thermoplastic composition according to claim 4 wherein the salt is selected from the group consisting of alkali metal and alkaline earth metal salts of hypophosphorous acid, metaphosphorous acid, pyrophosphorous acid, orthophosphorous acid, hypophosphoric acid, metaphosphoric acid, triphosphoric acid, pyrophosphoric acid and orthophosphoric acid.

References Cited

UNITED STATES PATENTS

| | | | |
|---|---|---|---|
| 3,594,446 | 7/1971 | Gabler et al. | 260—823 |
| 3,332,909 | 7/1967 | Farnham et al. | 260—47 |
| 3,565,862 | 2/1971 | Campbell et al. | 260—49 |
| 3,431,230 | 3/1969 | Jackson, Jr., et al. | 260—33.8 |
| 3,635,890 | 1/1972 | Takemura et al. | 260—47 |

LESTER L. LEE, Primary Examiner

U.S. Cl. X.R.

260—30.6, 37 R, 49, 79 R, 823; 264—331